United States Patent [19]
Severing

[11] Patent Number: 5,273,654
[45] Date of Patent: Dec. 28, 1993

[54] SOLVENT REMOVAL SYSTEM

[75] Inventor: Kenneth W. Severing, La Habra, Calif.

[73] Assignee: Aquatechnology Resource Management, Huntington Beach, Calif.

[21] Appl. No.: 895,326

[22] Filed: Jun. 8, 1992

[51] Int. Cl.$^5$ .............................................. B01D 11/00
[52] U.S. Cl. ................................. 210/634; 210/195.1;
210/263; 210/275; 210/290; 210/521; 210/791;
210/799; 210/805
[58] Field of Search ............... 210/634, 265, 275, 287,
210/786, 791, 708, 807, 803, DIG. 5, 195.1,
257.1, 521, 537, 799, 263, 290, 805

[56] References Cited

U.S. PATENT DOCUMENTS

| | | | |
|---|---|---|---|
| 1,838,263 | 12/1932 | Kelley | 210/265 |
| 1,992,420 | 2/1985 | Gleason et al. | 210/265 |
| 3,552,573 | 1/1971 | Mail | 210/275 |
| 3,853,753 | 12/1974 | Jones | 210/DIG. 5 |
| 3,933,654 | 1/1976 | Middelbeek | 210/521 |
| 3,957,647 | 5/1976 | Jones | 210/266 |
| 3,962,078 | 6/1976 | Hirs | 210/265 |
| 4,276,181 | 6/1981 | Cordier et al. | 210/265 |
| 4,407,706 | 10/1983 | Merchant, Jr. et al. | 210/708 |
| 4,530,767 | 7/1985 | Hirs | 210/708 |
| 4,874,534 | 10/1989 | Sorensen et al. | 210/803 |

Primary Examiner—Robert A. Dawson
Assistant Examiner—Ana M. Fortuna
Attorney, Agent, or Firm—Arthur Freilich; Robert D. Hornbaker; Leon D. Rosen

[57] ABSTRACT

Systems are described for removing organic solvents such as kerosene-based solvents, from aqueous solutions, in leaching processes for recovering metal such as copper from ore. A unit for recovering small amounts of kerosene-based solvent from raffinate (which comprises acidic water with a small amount of solvent and debris) includes both a plate-type coalescing device (60, FIG. 2) and a granular bed (62) in series, and preferably located in the same vessel (54). The raffinate first moves through the plate-type coalescing device where much of the kerosene is removed, to greatly increase the useful period of the granular bed (before it has to be backwashed). In a unit (20, FIG. 3) which gravity separates raffinate from metal-enhanced solvent by allowing them to flow in adjacent gravity-separated streams (116, 114), a coalescing device (120) lies along the lower stream (116) along which the raffinate moves, to coalesce solvent droplets and encourage them to rise into the upper stream (114) which is formed of metal enhanced solvent.

5 Claims, 2 Drawing Sheets

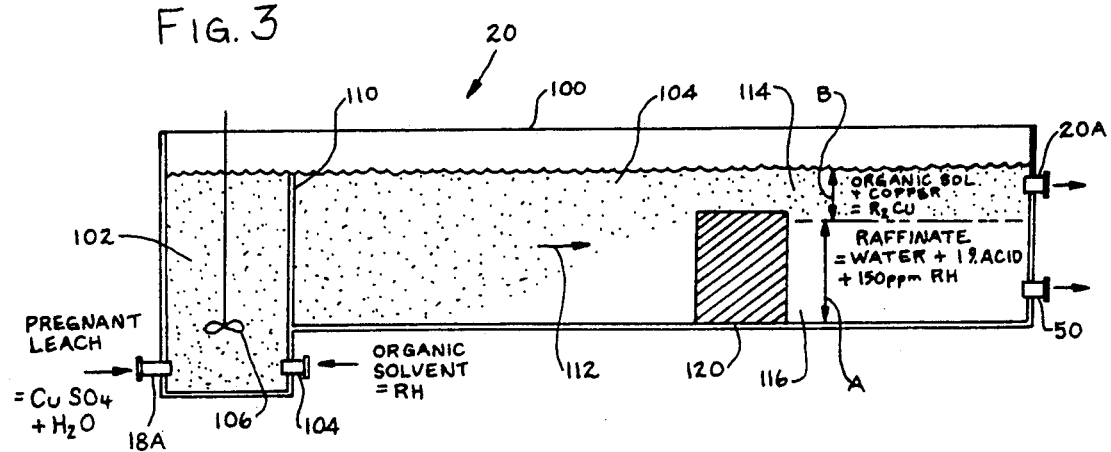
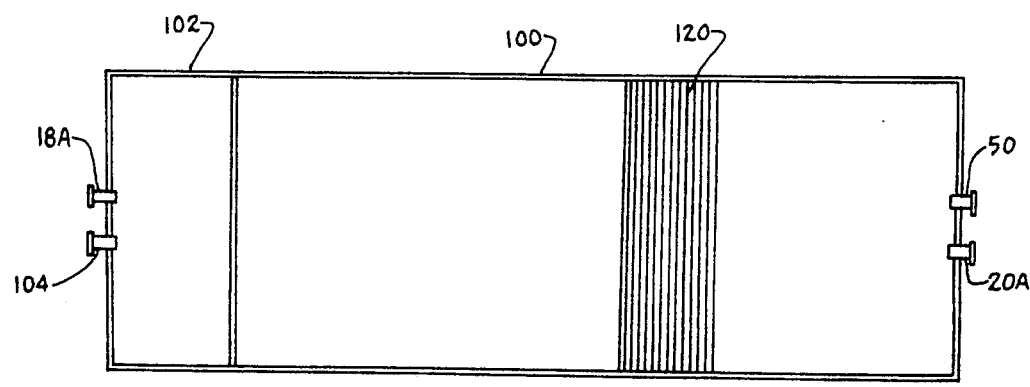

SOLVENT REMOVAL SYSTEM

BACKGROUND OF THE INVENTION

The present invention relates to the removal of organic solvents from aqueous process streams, which is involved in many industrial processes. The invention will be described in detail in connection with copper leaching and electrowinning processes.

The common leaching process for the recovery of copper from ore involves applying a leaching solution to the ore to produce a pregnant leach which includes copper sulfate. The pregnant leach is mixed with an organic solvent to transfer copper ions to the solvent, the copper ions later being transferred to an electrolyte from which they can be electroplated out. In the transference of copper ions from the pregnant leach to the solvent, some solvent remains behind with the leach solution (referred to as raffinate after the copper ions have been removed). Also, in the transference of copper ions from the solvent to an electrolyte (from which the copper is plated out) some solvent transfers to the electrolyte. Because of the relatively high cost of the solvent, steps are taken to remove the solvent so it can be reused. Prior art techniques for the removal of organic solvents from aqueous process streams in the leach mining of copper ores, are described in U.S. Pat. No. 4,874,534 by Sorenson et al. Systems which enhanced the removal of the solvent would be of considerable value in leach mining of copper and other metals, as well as in other industrial processes.

SUMMARY OF THE INVENTION

In accordance with one embodiment of the present invention, small amounts of solvent are removed from an aqueous solution by enhanced coalescing devices that coalesce small droplets of the solvent to allow them to rise within the aqueous stream. In a system where a pipe carries an aqueous solution with a small amount of solvent, a coalescing system includes both a plate-type coalescing device and a granular bed lying in series, and preferably within the same vessel. The aqueous solution with entrained solvent droplets, passes first through the plate-type coalescing device where much of the solvent is removed, and thereafter passes through the granular bed where most of the remaining solvent is removed. The plate-type coalescing device is useful over a long period before backwashing is required, and its presence greatly increases the period of use of the granular bed before it has to be backwashed. The location of the plate-type coalescing device and granular bed in the same vessel, facilitates gathering of the solvent and backwashing of both the bed and plate-type device.

Another embodiment of the invention comprises a transfer unit where material such as copper ions originally in a pregnant leach is transferred to the organic solvent. The raffinate (pregnant leach depleted of copper ions) and copper-enhanced organic solvent are separated by gravity into two adjacent streams, with the copper-enhanced solvent moving along an upper stream and the raffinate moving along a lower stream. A coalescing device is placed along the lower stream, to coalesce small droplets of solvent that are moving therealong, to encourage them to rise into the upper stream.

The novel features of the invention are set forth with particularity in the appended claims. The invention will be best understood from the following description when read in conjunction with the accompanying drawings.

BRIEF DESCRIPTION OF THE DRAWINGS

FIG. 3 is a sectional side view of the copper transfer unit of the system of FIG. 1.

FIG. 4 is a plan view of the copper transfer unit of FIG. 3, but with the inlet conduits shown in a different arrangement.

DESCRIPTION OF THE PREFERRED EMBODIMENTS

Figure 1:
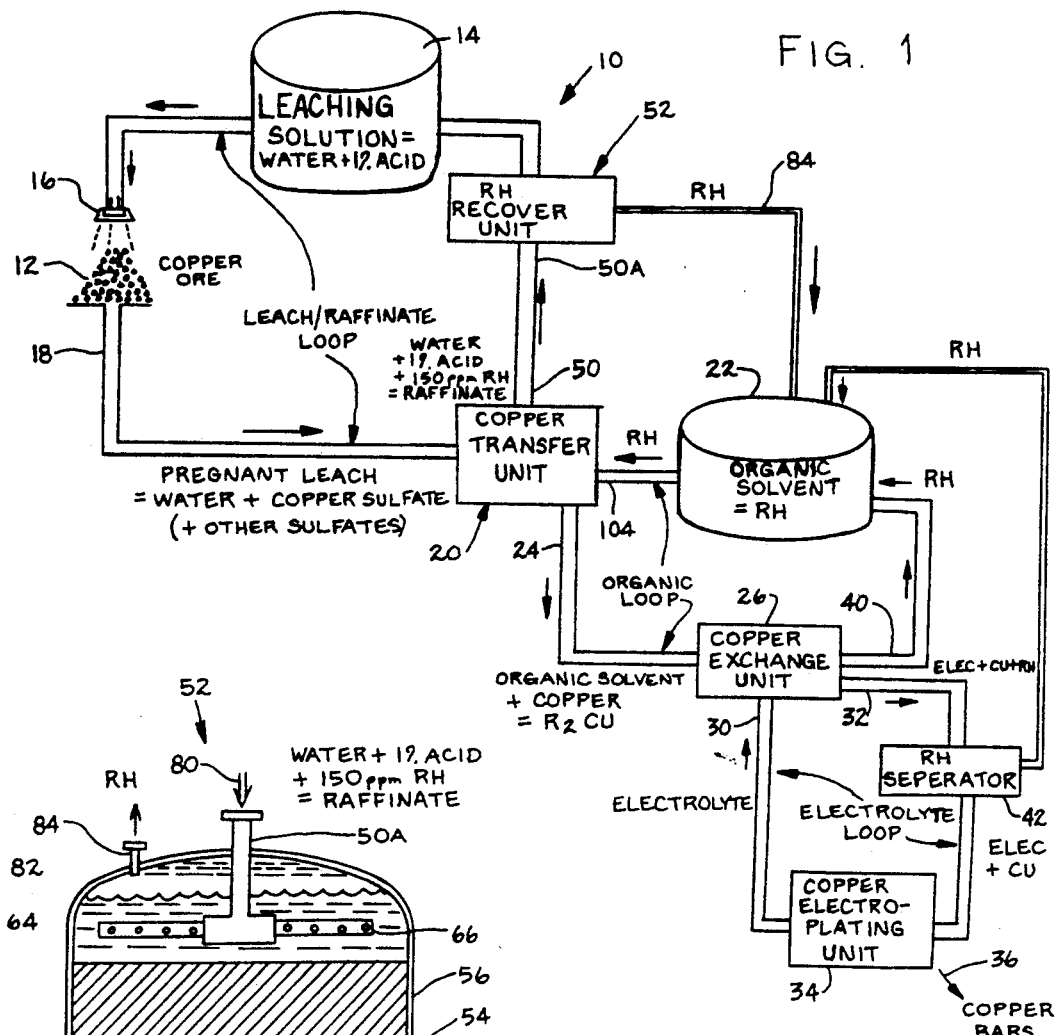
FIG. 1 is a schematic view of a copper leach/electrowinning system which uses solvent recovery methods and apparatus of the present invention.

FIG. 1 illustrates a copper leach/electrowinning system 10 for recovering copper from copper ore 12. The ore may contain copper sulfate as well as other sulfates and debris such as clay. A container 14 contains a leaching solution which comprises water and a small amount of acid such as one percent of sulfuric acid ($H_2SO_4$). A spraying unit 16 sprays the leaching solution onto the copper ore 12, and a pregnant leach is removed along a conduit 18. The pregnant leach includes water plus copper sulfate, plus other sulfates and particles of clay or other debris. The pregnant leach enters a copper transfer unit 20 where the pregnant leach is mixed with an organic solvent that is referred to as RH, with the H representing the hydrocarbon component of the solvent and R representing the rest of the solvent. Commonly, the organic solvent or RH is formed by kerosene and an extractant such as LIX984 sold by Henkel Corporation. In the copper transfer unit 20, copper and hydrogen are exchanged in the following reaction:

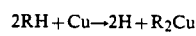

$$2RH + Cu \rightarrow 2H + R_2Cu$$

Thus, the "RH" which is the solvent in its hydrogenated form, is changed to "$R_2Cu$" in its dehydrogenated but copper enhanced form. Similarly, the pregnant leach undergoes the following reaction:

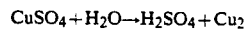

$$CuSO_4 + H_2O \rightarrow H_2SO_4 + Cu_2$$

The organic solvent is held in a container 22 which delivers it to the copper transfer unit 20. One output 24 of the copper transfer unit is the organic solvent plus copper ($R_2Cu$) which enters another copper exchange unit 26. In unit 26, copper ions are transferred from the organic solvent to an electrolyte entering the unit at an inlet 30. One outlet 32 of the unit 26 contains the electrolyte enhanced with copper. A small amount of solvent passing out through the outlet 32 is recovered by an additional recovery unit 42. The copper-enhanced electrolyte is delivered to a copper electroplating unit 34, or electrowinning unit, whose output indicated at 36, is copper bars. The copper exchange unit 26 has another outlet 40 containing hydrogenated organic solvent (RH), which is delivered back to the container 22. A loop referred to as "organic loop" represents the path of most of the organic solvent.

One outlet 50 of the copper transfer unit 20 contains raffinate, which includes water plus about one percent acid, and which also includes about 150 ppm (parts per million) of RH (organic solvent). The term "raffinate" refers to a liquid product resulting after extraction of a component with a solvent. It would be possible to deliver the raffinate from outlet 50 directly back to the container 14. However, the small amount of organic solvent (RH) in the raffinate passing along outlet 50, can be valuable. Such solvent may have a cost of about fifty five dollars per gallon, and a large flow of raffinate in large scale copper mining can give rise to the possibility of recovering considerable amounts of the organic solvent from the raffinate. Also, the solvent can interfere with downstream processes, so its removal is desirable. It may be noted that other minerals may be present in the raffinate (e.g. sulfates of magnesium or iron), and may have to be removed prior to returning the water and acid solution to the container 14.

One technique that can be used to separate the organic solvent from the raffinate, involves passing the raffinate through a plate-type coalescing device, or through a granular bed coalescing device of material such as crushed anthracite. Either coalescing device causes tiny droplets of the solvent to coalesce and form larger droplets that rise to the surface from which they can be removed. Plate type coalescing devices may use multiple closely-spaced plates through which the fluid passes, with the tiny droplets of solvent adhering to the plate-like elements and coalescing with other droplets until large enough drops are formed that the solvent can rise to the surface. It may be noted that the plates may have multiple large holes, as where they are formed from multiple metal or polymer wires or plastic gauze to form a plate-like mesh. It also being possible for the mesh not to be in multiple plate-form, as where it is formed of fixed-together fibers, or formed of steel wool. In all of such coalescing devices, more than 50% (usually more than 60%) of the total volume of the device is empty of solid material and therefore open to the passage of liquid therethrough, and such devices are herein referred to as "plate-type coalescing devices". This contrasts with granular beds, where the granules occupy more than 50% (usually more than 60%) of the volume through which liquid can pass. A problem with plate-type coalescing devices is that they remove only about 70% of the solvent.

Another type of coalescing device that has been used is a granular bed such as one formed of crushed anthracite. Such a coalescing device allows recovery of almost 100% of the organic solvent. Solvent droplets coalescing near the top of the bed rise and can be recovered. However, most solvent entering the bed coalesces in the middle and bottom portions thereof and does not rise. Instead, the bed becomes saturated with solvent, and the solvent starts to leak and then flow out of the bed. After perhaps four to five hours of use, the granular bed has to be cleaned as by backwashing. The requirement for frequent backwashing, which interrupts the leach extraction process, is a serious detriment to the use of granular bed coalescing devices.

In accordance with the present invention, a solvent recovery unit 52 (FIG. 2) is provided which enables recovery of substantially all organic solvent while providing a long period of use between required backwashings. The unit 52 includes a vessel 54 with upper and lower parts 56, 58. A plate-type coalescing device 60 lies in the upper part of the vessel, while a granular bed 62 lies in the lower part 58. A raffinate receiving conduit 50A is connected to the top part 64 of the vessel and has a discharge end 66 which distributes raffinate to the upper part of the vessel at a location above the plate-type coalescing device 60. A water, or leach outlet 70 is connected to a bottom part 72 of the vessel, and includes a collector 74 near the bottom of the granular bed 62. During normal operation, a large flow rate of raffinate flows downwardly, in the direction of arrow 80, into the vessel, flows down through the plate-type coalescing device 60, flows down through the granular bed 62, and flows out through the leach outlet 70.

As the raffinate flows downwardly through the plate-type coalescing device 60, small droplets of the solvent of the raffinate cling to the large surface area of the device, with further droplets encountering the earlier ones and coalescing to form larger drops of solvent. The solvent, such as a kerosene-based one, has a lower specific gravity than the raffinate which consists primarily of water. Accordingly, the drops of kerosene rise through the coalescing device 60 to the top part 64 of the vessel, where it forms a solvent pool 82. A solvent removal conduit 84 connected to the top part of the vessel draws off solvent that has been removed from the raffinate. ACS INDUSTRIES, INC. of Houston, Tex. and MUNTERS of Fort Myers, Fla. offer a variety of coalescers formed by plates and mesh that are suitable for use as the coalescing device 60. The coalescing device 60 removes about 70% of the solvent in the raffinate.

The partially-treated raffinate indicated at 90, passes down along the vessel to the lower part 58, where it passes through the granular bed 62. The granular bed, formed of crushed anthracite, coalesces substantially all of the remaining solvent. As mentioned above, droplets coalesced near the top of the bed rise through the plate-type coalescing device 60, to add to the solvent pool 82 which is removed through the conduit 84. The rest of the solvent passing through the bed is trapped therein. The rest of the original raffinate is leach, or leaching solution (other sulfates are not considered here) and can be reused.

The useful period of the granular bed 62 depends primarily upon the rate of flow of solvent therein, since most of the solvent is trapped in the bed. The fact that a high percentage, such as 70%, of the solvent flowing into the solvent recovery unit 52 is removed by the plate-type coalescing device 60, results in the granular bed 62 being operative for a much longer period such as twelve to thirteen hours, before backwashing is required. The plate-type coalescing device 60 may not clog, or may clog only very slowly, and may have to be backwashed perhaps only every fifty hours in the above example. Thus, by placing the plate-type coalescing device 60 in series with the granular bed 62, applicant greatly extends the period of use of the coalescing device, before flow has to be stopped for backwashing any part of it. Still, substantially all solvent is removed from the raffinate. Applicant prefers to place the plate-type coalescing device 60 and granular bed 62 in the same vessel, which has the advantage of requiring only a single pool 82 from which solvent has to be removed. By placing both in the same vessel, applicant also simplifies backwashing.

As mentioned above, the granular bed 62 has to be backwashed at intervals such as every twelve to thirteen hours. This can be accomplished by admitting scrub air and/or Water or other backwash fluid up through the bed, as by passing it into a scrub inlet 90, through the bed, and out through a bed backwash conduit 92. A screen 94 can be provided which lies between the backwash conduit 92 and the top of the granular bed 62, to prevent loss of granules. However, the screen 94 lies a distance above the top of the bed, to allow the granules to rise up to aid in backwashing them. As mentioned above, at intervals such as every fifty hours, applicant backwashes both the granular bed 62 and the plate-type coalescing device 60. This can be accomplished by passing scrub air and/or water up through the inlet 90, to flow through the bed 62 and device 60 and out through the raffinate receiving conduit 50A. Of course, a separate scrub outlet can be used instead. Since no part of the solvent recovery unit 52 can be used when any part is being backwashed, it is desirable to backwash the bed and plate-type coalescing device 60 at the same time. By placing both the device 60 and bed 62 in the same vessel, applicant facilitates backwashing both at the same time, since backwashing fluid (air and/or water) can flow directly upwardly from the bed through the plate-type device 60. It is also possible to wash the plate-type coalescing device 60 apart from the bed, as by flowing in backwash fluid through the conduit 92, although this would seldom be done. It is noted that applicant prefers to not backwash the plate-type device 60 at frequent intervals, in that it is more efficient at removing solvent after some solvent has collected on it.

Figure 2:
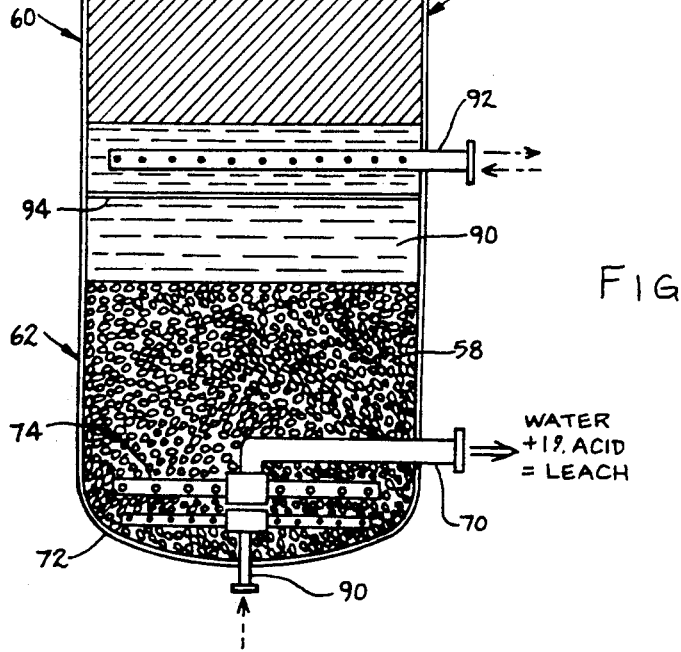
FIG. 2 is a sectional side view of the solvent recovery unit of the system of FIG. 1.

The general construction of the RH Separator 42 (FIG. 1) can be the same as that of the Unit 52 of FIG. 2, although an additional bed of fine garnet or sand may be placed at the bottom of the crushed anthracite bed for fine filtration of the electrolyte. The solvent recovery or separator units 52, 42 can be used in a variety of water/solvent applications, including water/crude oil separation and water/gasoline separation.

It may be noted that in some industrial processes, it is desirable to remove entrained solvent from a main liquid (liquid such as water that comprises over 50% of the flow) but it is not necessary to remove almost all of it. In such cases, it may be sufficient to use only the plate-type coalescing device 60. As discussed above, in the arrangement of FIG. 2 the main liquid to be treated flows downwardly through the vessel 54, and coalesced drops of the low specific gravity solvent rise to the top. The coalesced drops of solvent form a pool 82 in a pool region above the main liquid discharge 66, and can be removed from the top of the vessel through the conduit 84 that lies above the discharge 66. This arrangement is desirable because it enables main fluid flow and pooling of the coalesced drops, in a vessel of small size.

FIGS. 3 and 4 illustrate some details of the copper transfer unit 20 (shown in FIG. 1), wherein copper ions are transferred from the pregnant leach to the organic solvent. The copper transfer unit 20 shown in FIG. 3 includes a tank 100 which forms a mixing portion 102 and a separating portion 104. In the mixing portion 102, pregnant leach enters through a conduit 18A while organic solvent (RH) enters through another conduit 104. The pregnant leach and organic solvent are mixed in the mixing portion 102 as by a stirring device indicated at 106. Copper ions are transferred between the mixed fluids, and the fluids pass over a weir 110 into the separating portion 104 of the tank. The two fluids resulting from the mixing, separate under the force of gravity. This is because the copper-enhanced organic solvent has a lower specific gravity than the copper-depleted pregnant leach which is referred to as raffinate. The fluids move largely horizontally in the direction of arrow 112, while they separate by gravity, until the flow results in an upper stream 114 of organic solvent enhanced with copper, and a lower stream 116 formed by raffinate. The gravity-separated stream are removed, with the enhanced organic solvent removed through output conduit 20A and the raffinate removed through outlet 50. The long and slow horizontal flow also helps removal of finer particles which tend to settle at the bottom of the tank.

Although the lower stream 116 contains primarily raffinate, it also includes a small percentage of solvent such as 200 ppm (parts per million). In accordance with another aspect of the present invention, some of the solvent in the lower stream 116 is removed by a coalescing device 120 which lies in the path of the lower stream 116. As with other coalescing devices, the coalescing device 120 has a large surface area (a plurality of times greater than the cross-sectional area of said lower stream 116) to which small droplets of solvent cling, to coalesce with other small droplets and form drops that rise in the stream until they reach the upper stream 114. Although it is possible to trap a bed of anthracite granules or the like between fine screens, applicant prefers to use a plate-type coalescing device for the device 120, because it has a longer time of use between cleanings, and because the last bit of solvent can be removed by a downstream bed such as one in the solvent recovery unit described above. In one transfer unit 20 that applicant has designed, the lower stream 116 had a height A of twenty four inches, while the upper stream 114 had a height B of twelve inches, with both streams traveling at the same rate.

Thus, the invention provides systems for enhancing the recovery of organic solvents from aqueous process streams. In a recovery unit through which an aqueous solution such as a raffinate flows, where a coalescing device coalesces solvent droplets to recover them, applicant uses both a plate-type coalescing device and a granular bed in series, to enable nearly 100% solvent recovery in a unit having a long period of usage between shutdowns for backwashing. The plate-type coalescing device and granular bed preferably lie in the same vessel, which simplifies solvent removal while also facilitating simultaneous backwashing of both coalescing devices. In a transfer unit, where metal ions are transferred from a pregnant leach to an organic solvent, by mixing them and then allowing them to gravity separate into upper and lower streams, applicant places a coalescing device along the lower stream, along which the raffinate flows, to initially transfer solvent from the lower stream to the upper one.

Although particular embodiments of the invention have been described and illustrated herein, it is recognized that modifications and variations may readily occur to those skilled in the art, and consequently, it is intended that the claims be interpreted to cover such modifications and equivalents.

I claim:
1. Recovery apparatus for separating a solvent from a main liquid, comprising:
   a vessel;
   a plate coalescing device lying in said vessel;
   a granular bed lying in aid vessel below said plate coalescing device;
   means for passing fluid into said vessel, down through said plate coalescing device, down through said bed, and then out of said vessel.
2. Apparatus for separating kerosene based or other organic solvent from a mixture containing primarily water and also containing an amount of said solvent, by passing said mixture through said apparatus, comprising:
- a recovery system which includes a first part that comprises a plate type coalescing device, and a second part that comprises a granular bed, said first and second parts being located in series in the same vertically-extending vessel, with said granular bed lying below said plate type coalescing device, so said mixture passes in series first through said plate-type coalescing device and then through said granular bed.

3. The apparatus described in claim 2 wherein:
said vessel has an upper portion with a top lying above said plate-type coalescing device, a mixture-receiving conduit lying at said vessel upper portion and having a lower discharge and lying a distance below said top for passing said mixture into said vessel, a solvent removal conduit lying at said vessel upper portion and having a receive end lying above said mixture conduit lower end for passing recovered solvent out of said vessel and a water outlet lying at a lower portion of said bed for passing water out of said vessel.

4. A method for separating kerosene-based or other solvent from a mixture that includes said solvent, water, and debris, comprising:
positioning a plate-type coalescing device and a granular bed in the same vessel, with said bed below said plate-type device, and passing said mixture first through said plate-type colescing device, and then passing the portion of said mixture exiting said plate-type device through said granular bed, to thereby increase the time between washing of said bed;

said step of passing includes passing said mixture through a mixture-receiving conduit to a location within said vessel above said plate-type device, and downwardly through said plate-type device and downwardly through said bed and out through a water outlet at a bottom portion of said bed, while allowing said solvent to rise from said bed through said plate-type device to a top part of said vessel and to rise from said plate-type device to said top part of said vessel, and removing said solvent which has risen from both said bed and said plate-type device from a top part of said vessel through a solvent removal conduit.

5. A method for separating kerosene-based or other solvent from a mixture that includes said solvent, water, and debris, comprising:
passing said mixture first through a plate-type coalescing device, and then passing the portion of said mixture exiting said plate-type device through a granular bed, to thereby increase the time between washing of said bed;

backwashing said plate-type coalescing device and said bed, including passing a fluid upwardly through said bed and then upwardly through said plate-type device.

* * * * *